United States Patent
Fan (10) Patent No.: US 9,681,788 B2
(45) Date of Patent: Jun. 20, 2017

(54) VACUUM CLEANER AND WET DUST FILTER

(71) Applicant: TALENTONE HONG KONG LTD., Kowloon, Hong Kong (CN)

(72) Inventor: Sai Yiu Fan, Hong Kong (CN)

(73) Assignee: Talentone Hong Kong Ltd., Kowloon (HK)

( * ) Notice: Subject to any disclaimer, the term of this patent is extended or adjusted under 35 U.S.C. 154(b) by 69 days.

(21) Appl. No.: 14/418,739

(22) PCT Filed: Aug. 2, 2013

(86) PCT No.: PCT/IB2013/056338
§ 371 (c)(1),
(2) Date: Jan. 30, 2015

(87) PCT Pub. No.: WO2014/020573
PCT Pub. Date: Feb. 6, 2014

(65) Prior Publication Data
US 2015/0250370 A1 Sep. 10, 2015

(30) Foreign Application Priority Data
Aug. 2, 2012 (HK) .................................. 12107632.5

(51) Int. Cl.
*A47L 9/18* (2006.01)
*A47L 5/30* (2006.01)
(Continued)

(52) U.S. Cl.
CPC .................. *A47L 9/181* (2013.01); *A47L 5/28* (2013.01); *A47L 5/30* (2013.01); *B01D 46/521* (2013.01); *B01D 47/02* (2013.01); *B01D 50/004* (2013.01)

(58) Field of Classification Search
CPC ... A47L 9/181; A47L 5/28; A47L 5/30; B01D 47/02; B01D 46/521; B01D 50/004
(Continued)

(56) References Cited

U.S. PATENT DOCUMENTS

| 3,234,713 A | 2/1966 | Harper et al. |
| 2007/0089610 A1 | 4/2007 | Hayashi |
| 2012/0145009 A1 | 6/2012 | Kim et al. |

FOREIGN PATENT DOCUMENTS

| CN | 1849988 A | 10/2006 |
| CN | 1977747 A | 6/2007 |

(Continued)

OTHER PUBLICATIONS

International Search Report for PCT/IB2013/056338 Dated Mail Feb. 6, 2014.

*Primary Examiner* — David Redding
(74) *Attorney, Agent, or Firm* — Nixon Peabody LLP; Jeffrey L. Costellia (57) ABSTRACT

A vacuum cleaner (100) comprises a suction head (120), a suction source operable to generate suction at the suction head (120) for collecting dust or debris from a surface, a liquid filter assembly (190), and a handle portion (140) adapted to enable a user to move the suction head (120) on the surface during normal vacuuming operation. The liquid filter assembly (190) comprises an air inlet (1906) for receiving dusted air coming in from the suction head (120), a filter reservoir (1902) for receiving a cleansing liquid such as an aqueous cleansing liquid to form a cleansing bath for filtering dusted air coming in from the suction head (120), and an air outlet (1908) through which air moving out of the filter reservoir (1902). The liquid filter assembly (190) is mounted on a filter receptacle (186) formed on a rigid (Continued)

housing portion which is intermediate between the handle portion (140) and the section head (120).

18 Claims, 9 Drawing Sheets

(51) Int. Cl.
*A47L 5/28* (2006.01)
*B01D 46/52* (2006.01)
*B01D 47/02* (2006.01)
*B01D 50/00* (2006.01)

(58) Field of Classification Search
IPC .......................................................... A47L 9/18
See application file for complete search history.

(56) References Cited

FOREIGN PATENT DOCUMENTS

| | | |
|---|---|---|
| CN | 101779935 A | 7/2010 |
| CN | 201701153 U | 1/2011 |
| CN | 101669801 B | 5/2012 |
| EP | 1511412 A1 | 3/2005 |
| FR | 848793 A | 11/1939 |
| GB | 532863 A | 2/1939 |
| WO | WO2004/060128 A1 | 7/2004 |

Figure 8B

VACUUM CLEANER AND WET DUST FILTER

FIELD

The present disclosure relates to vacuum cleaners and dust filters, and more particularly to vacuum cleaners comprising dust filters having a cleansing liquid bath to remove dust and debris from dusted air. This invention also relates to vacuum cleaners having primary and secondary dust filters.

BACKGROUND

Vacuum cleaners are widely used to remove dust, particles and debris from a surface. A typical vacuum cleaner comprises a suction head which is connected to a suction source. The suction source usually comprises a suction generator which is operable to generate suction at the suction head to draw in dusted air. The dusted air is delivered to a filtration system where air-borne dust, particles and debris are removed and treated air will be returned to the ambient atmosphere.

Filtration systems that are used in vacuum cleaners are usually divided into the 'dry' type and the 'wet' type. A dry type filtration system is usually built on a porous filter which operates to block and remove air-borne dust size above a certain size from dusted air when a stream of dusted air passes through the porous filter. A porous filter is referred to as a dry filter herein and usually made of porous materials such as foam, cloth, fabrics, paper or a combination of such materials. The pore size of the porous materials that form a dry filter usually determines the maximum size of particles that can pass through a dry filter. HEPA filter is a typical example of a high efficiency dry filter, with efficiency of up to 99.97%.

While dry filters are widely used in vacuum cleaners, such as domestic, industrial, handheld, stick or tower types, the porosity requirements of dry filters mean that there is always a compromise between air-flow rate and filtering efficiency. Furthermore, dry filters require regular brushing or shaking in order to remove clogging due to deposit of particles on the pores which collectively define the dry filter. A dry filtration system sometimes uses a multiple-stage filter to extend time between cleaning or replacement. A multiple-stage filter typically comprises a coarse filter in combination with a fine filter.

A typical wet filtration system comprises a reservoir of cleansing liquid to facilitate cleansing of dusted air by a cleansing liquid bath. In operation, a stream of dusted air is passed through the cleansing liquid bath and air-borne articles are removed by the cleansing liquid bath. A dust filter comprising a cleansing liquid bath is referred herein as a wet dust filter or a wet filter where appropriate. Although a cleansing liquid bath usually comprises an aqueous based cleansing liquid, the cleansing liquid bath may be formed of cleansing solvents of other bases as and when required.

While wet filtration systems provide a useful solution and is beneficial to facilitate enhanced dust filtering efficiency, the risks that cleansing liquid may spill from a wet filter and/or get into the suction source during operation has somewhat limited applications of wet filtration systems in many types of vacuum cleaners. As a result, wet filtration systems are only found in commercially available upright type vacuum cleaners, and rarely, if at all, found in other types of vacuum cleaners such as the stick or broom type. An upright type vacuum cleaner in the present context is one in which the suction source is housed inside a main housing and the suction head is connected to the main housing by a length of flexible hose such that the suction head can move relative to the main housing to perform vacuuming operation independent of the main housing.

Therefore, it will be beneficial if wet filtration systems are also available in other types of commercially available vacuum cleaners.

DESCRIPTION OF FIGURES

Embodiments of the present disclosure will be described by way of non-limiting examples with reference to the accompanying Figures, in which:—

DESCRIPTION

A dust filter comprising an air inlet, a first reservoir for holding a cleansing liquid bath to facilitate liquid cleansing of dusted air, an inlet duct extending from the air inlet to inside the liquid bath, an air outlet for liquid cleansed air to egress from said liquid bath, and a second reservoir is disclosed. The second reservoir is to receive and store cleansing liquid that moves away from said first reservoir in response to tilting of said dust filter. The second reservoir is beneficial as it provides a buffer to temporarily hold the cleansing liquid when dust filter is tilted, thereby mitigating the risks that cleansing liquid egresses through the air outlet and move into the suction generator of a vacuum cleaner.

A second reservoir (or a 'secondary reservoir) of this filter may have one or a combination of the following characteristics:
  a) adjacent said first reservoir
  b) elevated above the first reservoir when the air outlet is above the air outlet
  c) separated from the first reservoir
  d) between the first reservoir and the air outlet In an example, the first reservoir is for storing cleansing liquid when in a stowed configuration, and the second reservoir is for storing cleansing liquid to form a cleansing liquid bath during normal operation of a vacuum cleaner.

In an example, the volume of the second reservoir is larger or comparable to that of the first reservoir. In an example, the volume of the second reservoir is calculated to hold a volume of cleansing liquid bath which is to spread into the second reservoir when the dust filter is subject to maximum titling during normal operation.

In an example, the second reservoir is located between the air outlet and the first reservoir, and the volume of said second reservoir is comparable to or larger than that of said first reservoir such that cleansing liquid moving away from said first reservoir and towards said air outlet due to titling of said dust filter will be received by said second reservoir.

In an example, the second reservoir comprises a concave receptacle which surrounds said inlet duct. The second reservoir may comprise two concave receptacle portions which are on diametric opposite sides of said inlet duct.

In an example, the dust filter comprises a rigid housing on which said first reservoir and said second reservoir are defined, and the portion of said rigid housing that defines said second reservoir flares or gradually spreads outwards to define a or said concave receptacle or a or said concave receptacle portion as it extends away from said first reservoir and in a direction towards said air outlet.

In an example, there is a peripheral wall which interconnects said air outlet and said first reservoir and defines said second reservoir, and said peripheral wall defines a curved volume which tapers towards said first reservoir.

In an example, said first reservoir is at bottom, said air outlet is at top, and said second reservoir is intermediate said first reservoir and said air outlet; and wherein said second reservoir is formed as a continuation to said first reservoir to define a liquid receptacle which is at an inclination to that of said first reservoir.

The inclination may be larger than or equal to one of 15°, 30°, 45°, 60°, 75°, 90° and/or smaller than or equal to one of −15°, −30°, −45°, −60°, −75°, −90° relative to liquid surface of said first reservoir when said dust filter is not tilted.

Said air inlet may be surrounded by said air outlet, and said air inlet duct is suspended on said rigid housing and extends in an axial direction downwards towards and into said first reservoir, said axial direction being orthogonal or substantially orthogonal to liquid surface of said first reservoir when said dust filter is not tilted.

Said baffle may formed as an attachment on said air inlet duct at a level above the cleansing liquid level defined by said first reservoir to block upward splashing of cleansing liquid from said first reservoir towards said air outlet during normal vacuuming operation. For example, the baffle may extend radially outwards from the air inlet duct to form an umbrella to shield the air outlet or air outlet duct from liquid splashed from the cleansing liquid bath.

Said air inlet, said air outlet and said air inlet duct may collectively form a detachable assembly which is removable from form top end of said dust filter. This facilitates convenient cleansing of the assembly as well as the cleansing bath.

There is also disclosed a vacuum cleaner comprising a suction head, a suction generator operable to generate vacuuming suction at the suction head to take in dusted air, a handle portion adapted to move the suction head to work on a surface to be vacuumed, and a dust filter mounted; wherein the dust filter is to operate at an elevation level above said surface and/or said suction head during normal vacuuming operation and said elevation changes in response to change in tilting angle of said handle portion relative to said surface and/or said suction head; and wherein said dust filter comprises a reservoir to define a liquid bath to facilitate cleansing of dusted air coming in from said suction head.

Said dust filter may be mounted on a filter receptacle formed on a rigid and elongate housing portion that connects the handle portion to the suction head such that said dust filter follows movements of said handle portion during normal vacuuming operation, and wherein an assembly comprising said handle portion and said dust filter is moveable, for example pivotally moveable, relative to said suction head about a hinge axis or a universal joint; and wherein said hinge axis being orthogonal or substantially orthogonal to a longitudinal axis extending along said elongate housing portion.

Said filter receptacle may be adapted to detachably receive said dust filter, and said dust filter is to move towards said receptacle for attachment and move away from said receptacle for detachment in a direction orthogonal or substantially orthogonal to said longitudinal axis.

Said dust filter is formed as a plug-in module for plug-in coupling with said suction head and suction generator.

A dusted inlet channel may be provided to connect between said suction head and said dust filter, and said dusted air inlet channel extends from said suction head to beyond said dust filter and returns towards said dust filter for air coupling therewith.

A vacuum cleaner according to the present disclosure may be one that comprises a dust filter assembly having features or a combination of features disclosed herein.

The vacuum cleaner may comprise a secondary dust filter which is downstream of said dust filter. The secondary dust filter may be a dry filter such as a pleated element type. This facilitates a combination of wet and dry filtration within a single vacuum cleaner.

A vacuum cleaner disclosed herein may be a stick or broom shaped vacuum cleaner having an elongate main body which is moveable within a range of inclination angles with respect to a suction plane of the suction head. The range of inclination angles is useful to adjust height of the handle portion above the suction plane to provide user comfort to an operator. The main elongate body is usually kept vertical or at an inclination of zero degree to the vertical such that a main longitudinal axis passing through the length of the elongate main body is orthogonal or substantially orthogonal to the suction plane of the suction head. The range of inclination of the main body is typically in the range of 90°, although a range of 45° to 60° to the vertical is mostly used for most practical applications.

The suction generator may be mounted on said rigid and elongate housing portion and above said filter receptacle.

In general, there is described a vacuum cleaner comprising a suction head, a suction generator operable to generate vacuuming suction at the suction head, a handle portion adapted to move the suction head on a surface to be vacuumed during normal vacuuming operations, a rigid housing portion in connection with the suction head and the handle portion, and a dust filter comprising a reservoir which is adapted to receive a cleansing liquid to form a cleansing liquid bath when in use normal vacuuming operations, the dust filter being mounted on the rigid housing portion. The dust filter is adapted to feed incoming air from the suction head to move inside the cleansing liquid bath for rinsing by agitation by the cleansing liquid bath when the incoming air moves from inside the cleansing liquid bath to outside the cleansing liquid bath during normal vacuuming operations whereby dust or debris carried in the incoming air is removed from the incoming air.

In one aspect, there is provided a dust filter comprising a reservoir for receiving a cleansing liquid bath. The dust filter comprising a liquid container having a concaved side wall, an air inlet and an air outlet; wherein the volume of the reservoir between the air outlet and the reservoir is less than the volume of the concave portion of the liquid container when the dust filter is tilted from the vertical.

A vacuum cleaner 100 depicted in FIGS. 1, 1A, 1B and 2 comprises a suction head 120, a handle portion 140 and a main body 160 which connects the suction head 120 and the handle portion 140. The main body 160 is elongate and comprises an upper body portion 170 and a lower body portion 180 as depicted in FIGS. 3 and 3A. A primary dust filter assembly 190 is mounted on a filter receptacle 186 which is formed on the lower body portion 180.

Figures 4, 4A:
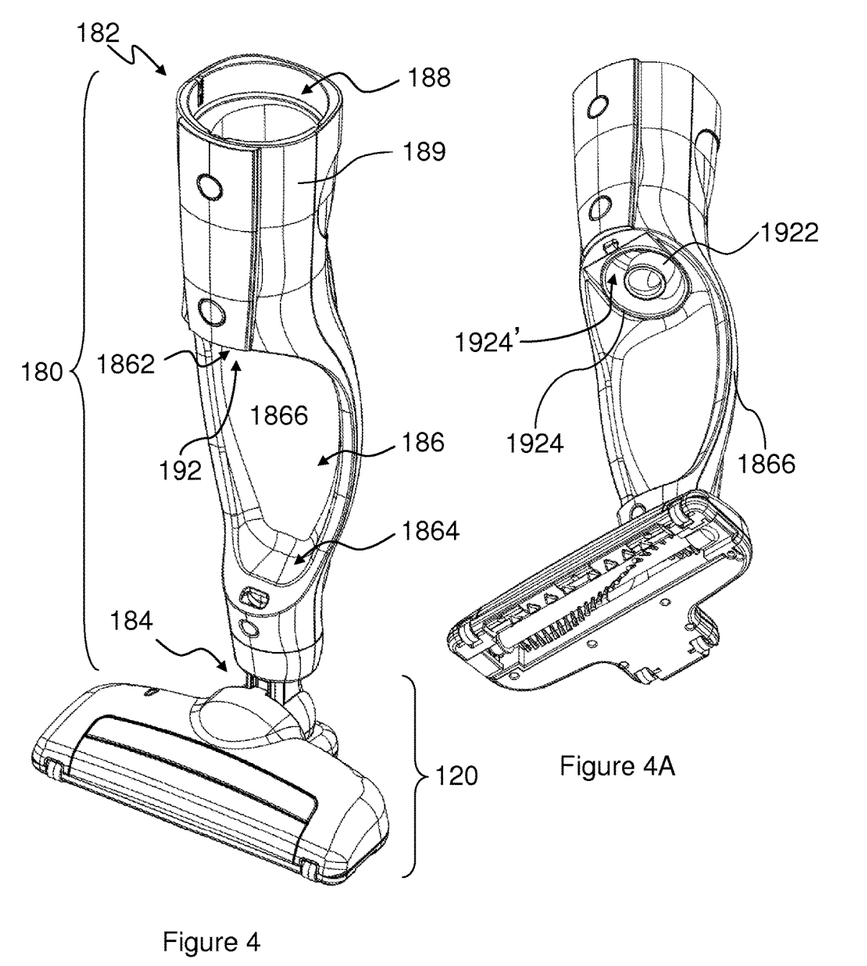
FIGS. 4 and 4A are enlarged front perspective views of the second sub-assembly of FIG. 3 from above and below with the primary filter assembly detached.

The lower body portion 180 comprises a rigid housing which is assembled from moulded hard plastics parts. The lower body portion 180 is elongate and extends in an axial or longitudinal direction between an upper axial end 182 and a lower axial end 184 as depicted in FIGS. 4 and 4A. A bridging portion 1866 and a skirt portion 189 are formed on the lower body portion 180. The skirt portion 189 comprises a peripheral wall which defines a hollow compartment that extends between the upper axial end 182 and the bridging portion 1866. A filter coupling assembly 192 comprising an inlet coupler 1922 and an outlet coupler 1924 is formed on the bottom of the skirt portion 189 as depicted in FIGS. 4 and 4A. The inlet coupler 1922 is for making air tight coupling with the air inlet 1906 on the primary dust filter assembly and the outlet coupler 1924 is for making air tight coupling with the air outlet 1908 of the primary dust filter assembly.

The bridging portion 1866 comprises a concavely curved back portion which extends from a back side of the peripheral wall downwardly towards the lower axial end 184. The bottom of the skirt portion 189, the concavely curved back portion of the bridging portion 1866 and the lower axial end 184 collectively define the filter receptacle 186. The filter receptacle 186 extends axially between an upper axial end 1862 which is proximal the skirt portion and a lower axial end 1864 which is proximal the suction head as depicted in FIG. 4. The back portion of the bridging portion 1866 is concavely shaped to be complementary to the portion of the housing of the primary dust filter assembly 180 juxtaposing the bridging portion 1866 for well fitted retention of the primary dust filter assembly 190. An indentation is formed at the lower axial end 1864 of the filter receptacle 186 to facilitate quick mounting of the primary dust filter assembly 190 onto the filter receptacle 186. The upper end of the hollow compartment which is defined by the peripheral wall of the skirt portion 189 forms a receptacle for latched reception of an axial end portion 174 of the upper body portion 170. Counterpart latching mechanisms are formed at corresponding locations on the upper axial end 182 of the lower portion 180 and the lower axial end 174 of the upper body portion 170 to facilitate releasable latching between the upper body portion 170 and the lower body portion 180 in an airtight manner sufficient to facilitate transport of air from the outlet coupler 1924 to the secondary dust collection chamber of the upper body portion 170 by suction.

The lower axial end 184 includes a universal joint which forms a pivotal connection with the suction head 120. An air inlet aperture for coupling dusted air from the suction head 120 to the lower body portion 180 is formed at the lower axial end 184. This air inlet aperture at the lower axial end 184 is connected to the inlet coupler 1922 by an internal air duct 1926. This internal air duct 1926 is inside the bridging portion 1866 to guide dusted air to move from the lower axial end 184 upwards towards the filter receptacle 186. The internal air duct 1926 projects upwards from the lower axial end 184, extends axially along the bridging portion 1866, bends radially inwards towards the centre of the hollow compartment on emerging from the bridging portion 1866 but before reaching the upper axial end 182, and then bends downwards towards the filter receptacle 186 to terminate at the inlet coupler 1922.

The upper body portion 170 includes a rigid plastic housing which defines an upper axial end 172 and a lower axial end 174. A peripheral wall extending between the upper axial end 172 and the lower axial end 174 defines a hollow compartment. The hollow compartment has a substantially circular cross section along its length and with the maximum cross-sectional dimension at its middle portion. The upper body portion 170 gradually tapers from its middle portion towards its upper 172 axial end and its lower 174 axial end. As depicted in FIG. 3A, the upper body portion 170 has a bomb shaped or capsule shaped streamlined profile with two pointed tips on the opposite axial ends 172, 174. A suction assembly comprising a motor, a suction fan driven by the motor, power and control circuitry, and a rechargeable battery to operate the motor is housed in the hollow compartment. The rechargeable battery may be a 18V Lithium battery. A suction inlet in communication with the hollow compartment is formed at the lower axial end 174 of the upper body portion 170 to provide an inlet for air emerging from the primary dust filter assembly 190 to enter the hollow compartment of the upper body portion 170 when the suction generator is in operation. The motor and the suction fan collectively forms a suction generator which operates to generate suction power at the suction inlet on the lower axial end 174.

Figure 2:
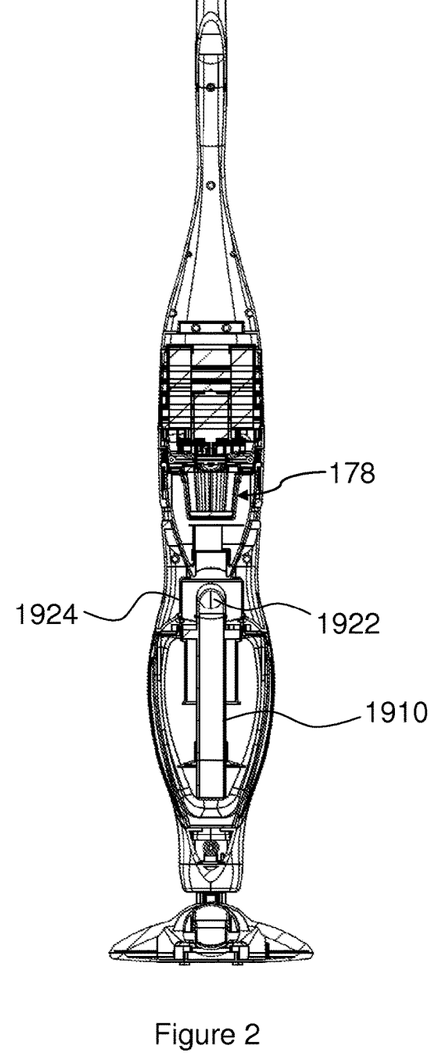
FIG. 2 is a longitudinal cross sectional view of the vacuum cleaner taken along line A-A' of FIG. 1B.
Figure 2A:
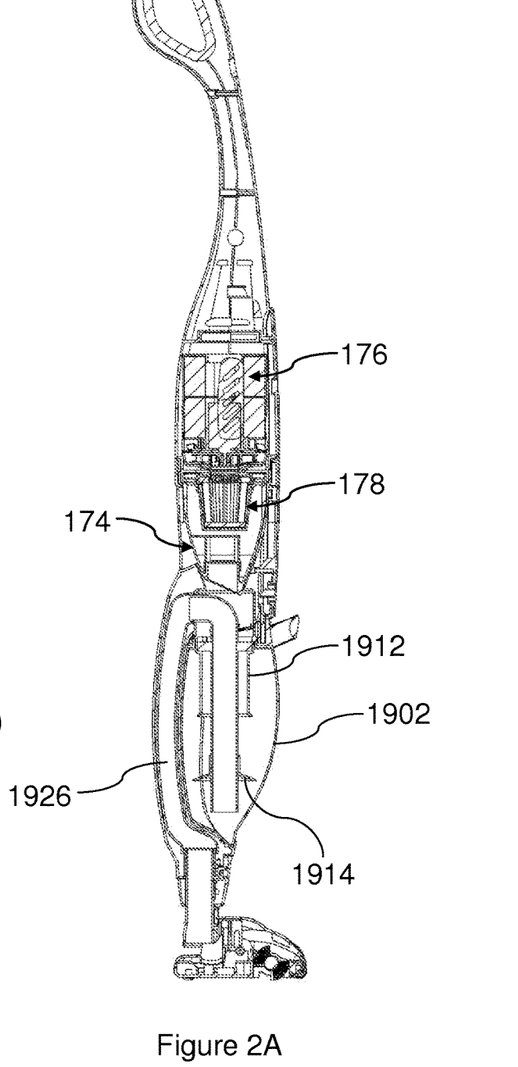
FIG. 2A is a longitudinal cross sectional view of the vacuum cleaner taken along line B-B' of FIG. 1.
Figure 3:
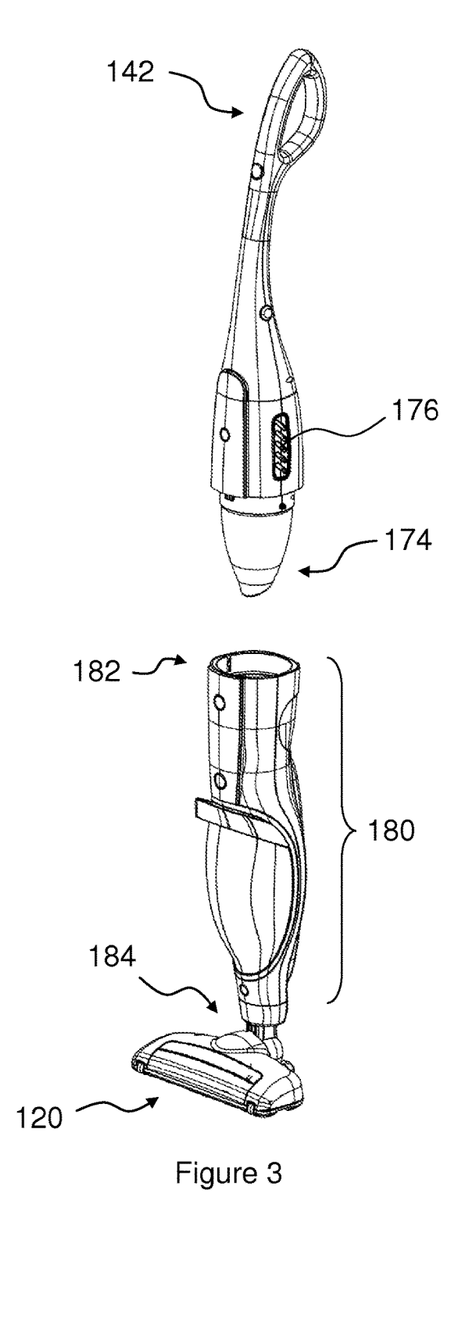
FIG. 3 is a perspective view showing the vacuum cleaner of FIG. 1 separated into a first sub-assembly comprising the handle portion and the upper body section detached and a second sub-assembly comprising the lower body section and the suction head.
Figure 3A:
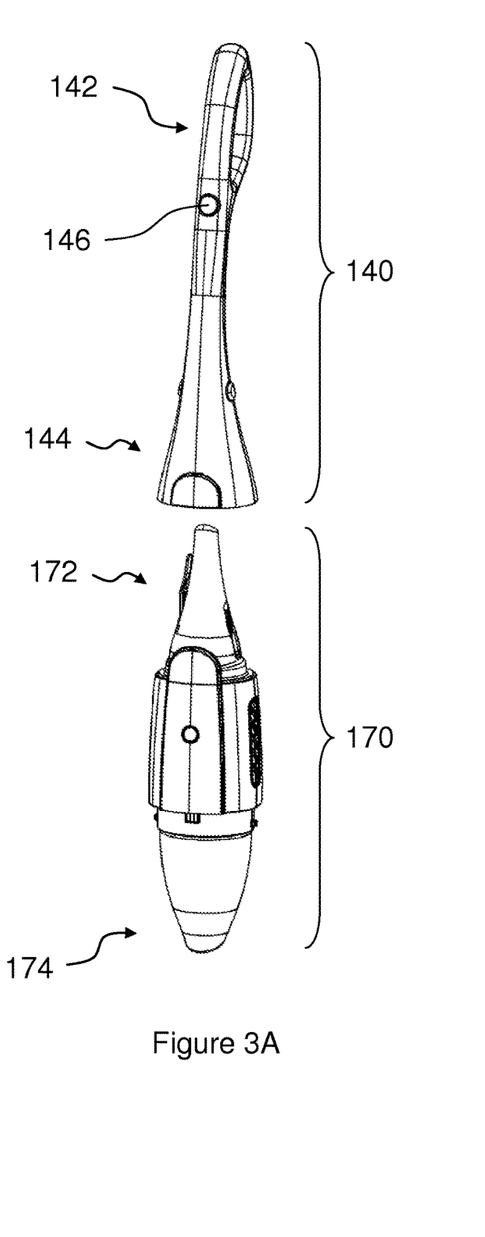
FIG. 3A is a partial exploded view of the first sub-assembly of FIG. 3 showing the handle portion detached from the upper body section.

A secondary dust filter assembly 178 is provided inside the hollow compartment downstream of the suction generator as depicted in FIGS. 2 and 2A. The secondary filter assembly is a dry filter such as a pleated filter element and may be a single- or multi-stage filter. The portion of the hollow compartment that is between the secondary dust filter and the lower axial end 174 forms a secondary dust collection chamber in the upper body portion 170. Control buttons for operating the suction generator and mains power connector for connecting the suction generator to mains power supply are located on the outside of the upper body portion 170 to facilitate control of the suction generator. A power connector is provided on the peripheral wall to enable the suction assembly to tap AC power from the mains supply.

Visual indicators such as LED indicators are provided on the peripheral wall to enable an operator to monitor the status of the vacuum cleaner. A ventilating grille 176 is provided on the peripheral wall at a location adjacent the suction generator to permit exit of filtered air from the upper body portion 170.

When the suction assembly is in vacuuming operation, suction appearing at the suction inlet on the lower axial end 174 will operate to draw air emerging from the primary dust filter assembly 190 and arriving at the lower axial end 174 into the secondary dust collection chamber of the upper body portion 170. Air filtered by the secondary dust filter assembly will then exit the upper body portion 170 through grille 176.

While the upper body portion 170 is adapted to perform secondary filtering subsequent to primary filtering by the primary dust filter assembly, the module defined by the upper body portion 170 has all the essential features of a vacuum cleaner and can be used as a stand-alone vacuum cleaner when detached from the lower body portion 180.

The handle portion 140 includes a rigid and elongate housing which is curved to define a looped handle 142 at one end and a mechanical coupler at the opposite end 144 as depicted in FIG. 3A. The rigid housing of the handle portion 140 flares at the lower end 144 to define a compartment which is shaped to complementary receive an axial length of the upper axial end 172 of the upper body portion 170. Counterpart latching mechanisms are formed at corresponding locations on the upper axial end 172 of the upper portion 170 and the lower end 144 of the handle portion 140 to facilitate releasable latching between the upper body portion 170 and the handle portion 140. The flared end 144 is shaped like a trumpet end so that the lower end 144 can cap squarely on the upper portion of the upper body section 170 in a closely fitted manner to facilitate driving of the portion of the vacuum cleaner to move along a surface to be vacuumed. An on/off button 146 is provided near the looped handle portion for a user to control operation of the vacuum cleaner 100.

Figures 5, 5A:
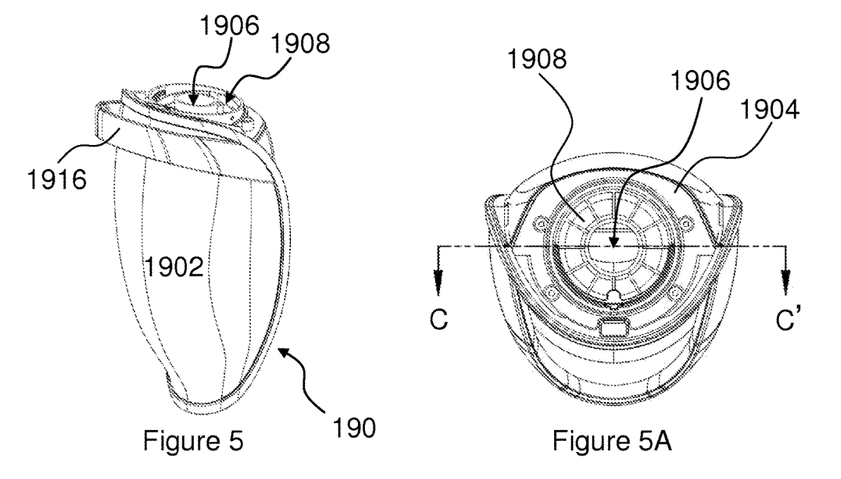
FIG. 5 is a front perspective view depicting the primary filter assembly.
FIG. 5A is a top plan view of the primary filter assembly.
Figure 5B:
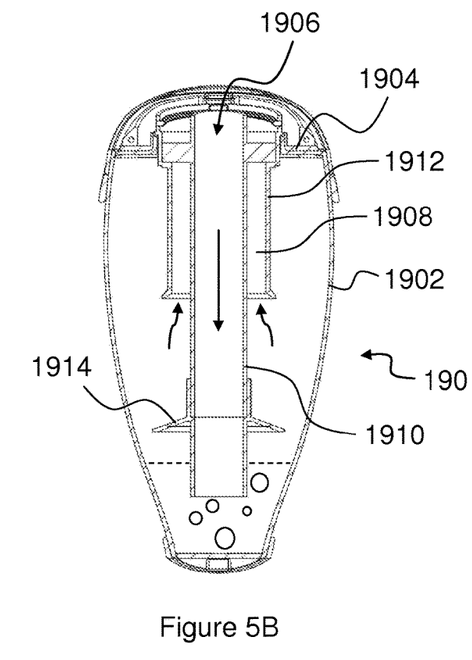
FIG. 5B is a longitudinal cross-sectional view taken along line C-C' of FIG. 5A.
Figure 5C:
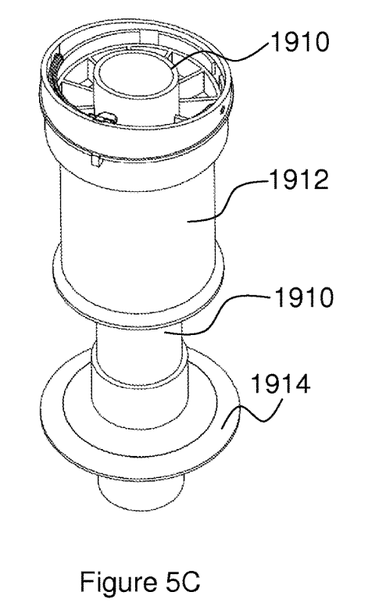
FIG. 5C is a perspective view depicting the core assembly of the primary filter assembly.

The primary dust filter assembly 190 comprises a rigid housing which forms a liquid container and an air guide assembly which is attached to the rigid housing as depicted in FIGS. 5, 5A and 5B. The liquid container comprises a bottom portion and a peripheral portion which projects upwardly from the bottom portion to define a top portion and a top aperture surrounded by the top portion. The air guide assembly is attached to the top portion of the liquid container to provide an air exchange mechanism to facilitate transport of dusted and filtered air across the top portion of the liquid container without mixing. This air exchange mechanism includes a dusted air duct 190 for guiding dusted air to move into the liquid bath of the primary dust filter assembly 190 and a filtered air duct 1912 for guiding air emerging from the cleansing liquid bath to move out of the rigid housing without mixing.

The liquid container defines a primary reservoir, a secondary reservoir, and an empty or free space above the primary reservoir. The primary reservoir is defined by a bottom surface on the bottom portion of the liquid container and extends upwardly to a vertical level above the bottom surface. This vertical level may be between a maximum level and a minimum level marked on the peripheral wall of the liquid container. The peripheral wall is transparent to make the marking visible. The maximum depth of the primary reservoir is defined by the maximum level and an example maximum depth suitable for this example is ¼ or ⅜ of the vertical span of the liquid container between the bottom surface and the top end of the rigid housing. The peripheral portion includes a peripheral wall 1902 which surrounds the primary reservoir. The peripheral wall 1902 flares or spreads outwardly and away from the bottom surface as it extends upwardly towards the top aperture. The flared or spread peripheral wall tapers and converges after reaching a location of maximum lateral span or maximum lateral cross sectional area above the primary reservoir. The location of the maximum lateral span or the maximum lateral cross sectional area (or 'maximum bulge') occurs in this example is selected to be at a height which is between ½ and ¾ of the height of the liquid container. Of course, this location of maximum bulge may be at a higher or lower vertical level without loss of generality.

The initial divergence of the peripheral wall from the bottom surface and subsequent convergence towards the top end of the liquid container as the peripheral wall projects vertically upwards and away from the primary reservoir cooperate to define a secondary reservoir. This secondary reservoir is formed at an elevation level above the primary reservoir. The volume defined by the secondary reservoir is adapted to provide a storage buffer which is sufficiently large to temporarily accommodate cleansing liquid which flows out of the primary reservoir when the primary dust filter assembly is tilted due to inclination of the main body 160 of the vacuum cleaner from the vertical during normal vacuuming operations, such that the cleansing liquid does not get sucked into the suction assembly. The secondary reservoir is adapted such that the maximum volume of cleansing liquid in the reservoir does not reach the top aperture even when the vacuum cleaner is at its maximum operational inclination limit. In the example vacuum cleaner of FIG. 1, the maximum operational inclination limit will be at 90° from the vertical and this inclination corresponds to having the main body 160 levelled with its longitudinal axis at the horizontal level or parallel to the suction plane of the suction head 120. However, the maximum operational inclination angle of the vacuum cleaner for most practical purposes is expected to be well below 90°, with an inclination of between 45° to 65° (from the vertical) being most common.

The peripheral wall has a concavely curved profile to define a secondary reservoir having a concave base as it extends in a direction from the top of the primary reservoir to the top end of the liquid container. The concave profile is beneficial as it confers the primary dust filter assembly an overall smooth or streamlined profile in the axial direction.

The air guide assembly comprises a mounting plate 1904, a dusted air inlet 1906 defined by a top axial end of an air inlet duct 1910, an air outlet 1908 defined by a top axial end of an air outlet duct 1912, and an anti-splashing baffle 1914 as depicted in FIGS. 5, 5A, 5B and 5C. The air inlet duct 1910 comprises a tubular portion which extends downwardly until its bottom axial end is below the minimum level of the reservoir. An anti-splashing baffle 1914 is mounted on the air inlet duct at a location near its bottom axial end but above the maximum level of the reservoir. The air outlet duct 1912 comprises a tubular portion which surrounds the air inlet duct 1910 to define an air outlet aperture. The air outlet duct 1912 extends axially downwards towards the primary reservoir and terminates at an elevation level above the anti-splashing baffle 1914. The anti-splashing baffle 1914 comprises an umbrella like liquid shield which extends radially outwards from the air inlet duct 1910. The liquid shield has a dimension that is sufficient to shield the air outlet aperture from cleansing liquid which is splashed upwardly from the primary reservoir during normal operation. The air inlet duct 1910 is supported on the air outlet duct 1912 by a vented support structure. The air outlet duct 1912 is in turn supported on the mounting plate 1904. The mounting plate 1904 is mounted on the top portion of the liquid container of the primary dust filter assembly 190 and seals the top aperture except the air inlet 1906 and the air outlet 1908.

The portion of the liquid container of the primary dust filter assembly 190 that defines the secondary reservoir has a substantially circular cross section along the length of the air inlet duct 1910 and with the air inlet duct 1910 at the centre. The circular cross section means that the secondary reservoir circumferentially surrounds the air inlet duct 1910. The circumferential distribution of the secondary reservoir around the air inlet duct 1910 also means the secondary reservoir is available to provide a buffer storage to temporarily receive cleansing liquid flowing out of the primary reservoir due to tilting of the primary dust filter assembly 190 and irrespective of the orientation of titling, that is, whether the tilting is forward, backward, sideward or a combination between sideward and forward or sideward.

To assemble the vacuum cleaner 100 from its components, the lower axial end 174 of the upper body portion 170 is inserted into the receptacle defined by the skirt portion 189 of the lower body portion 180 and the two body portions 170, 180 are latched into engagement through operation of the counterpart latching mechanisms. Likewise, the handle portion 140 and the upper axial end 172 of the upper body portion 170 are latched into engagement through operation of the corresponding counterpart latching mechanisms. The primary dust filter assembly 190 is mounted onto the filter receptacle 186 after the primary reservoir has been filled with a cleansing liquid to a working level and to enter into airtight coupling engagement with the filter coupling assembly 192 on the lower body portion 180.

Figures 1, 1A:
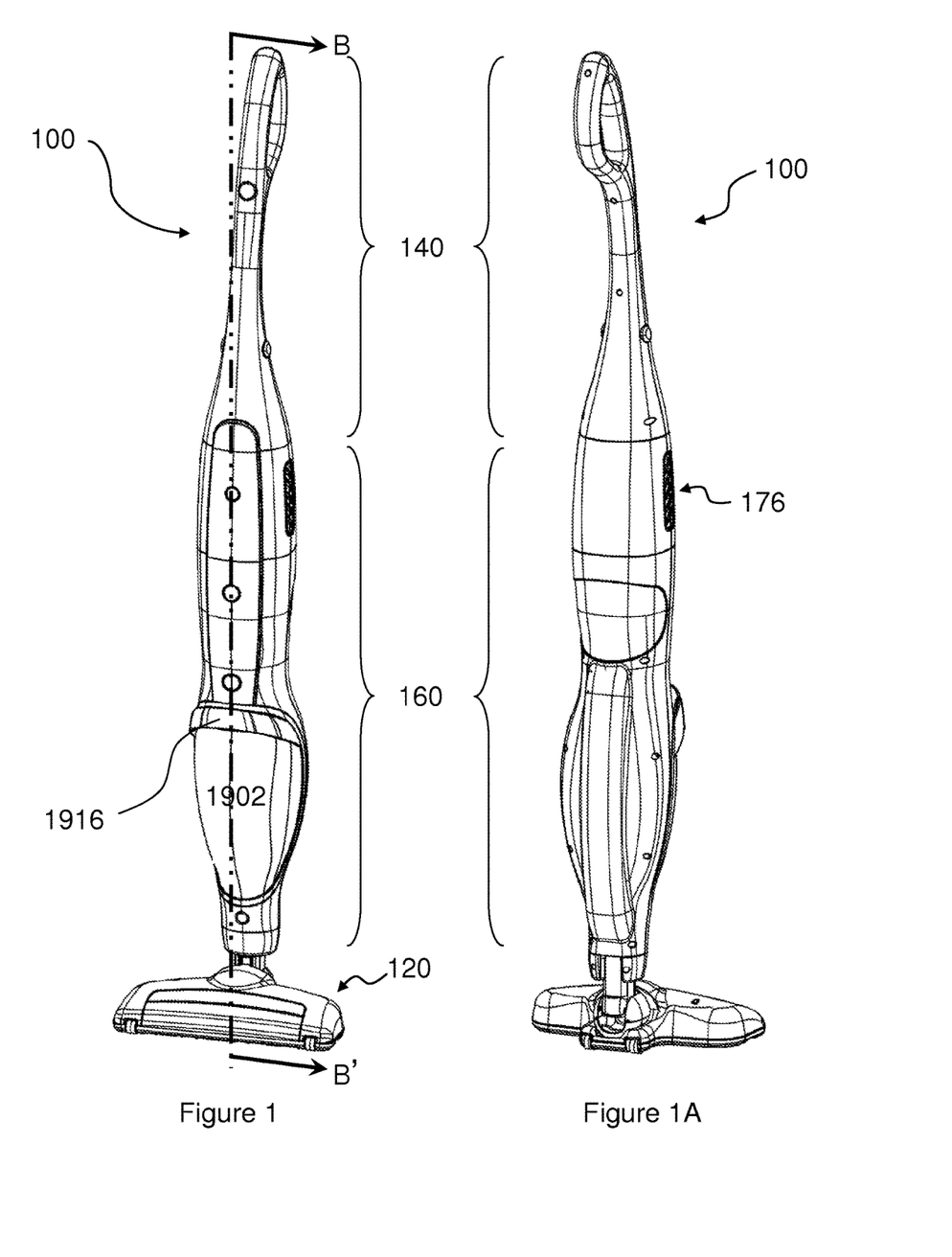
FIGS. 1 and 1A are respectively front and rear perspective views of an example vacuum cleaner of the present disclosure.
Figure 1B:
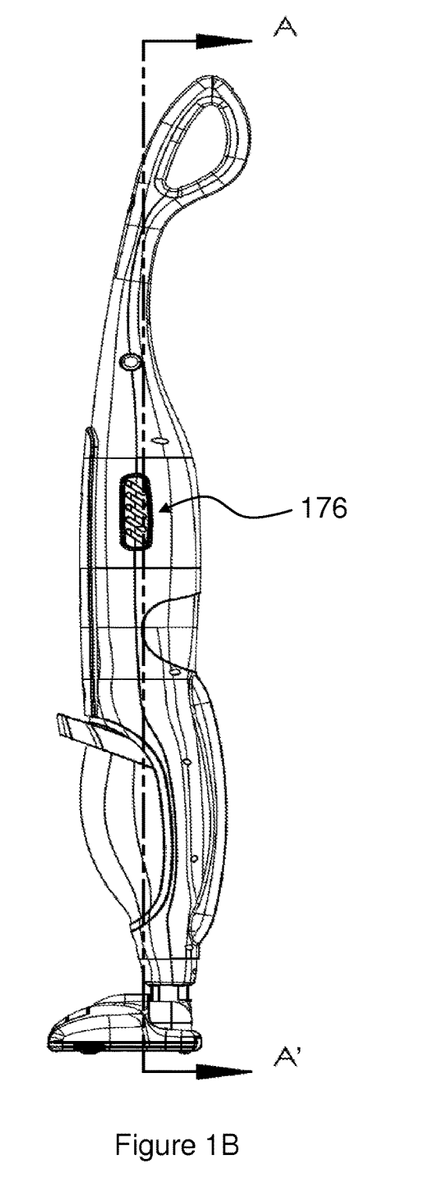
FIG. 1B is a side view showing the vacuum cleaner of FIG. 1.
Figure 1C:
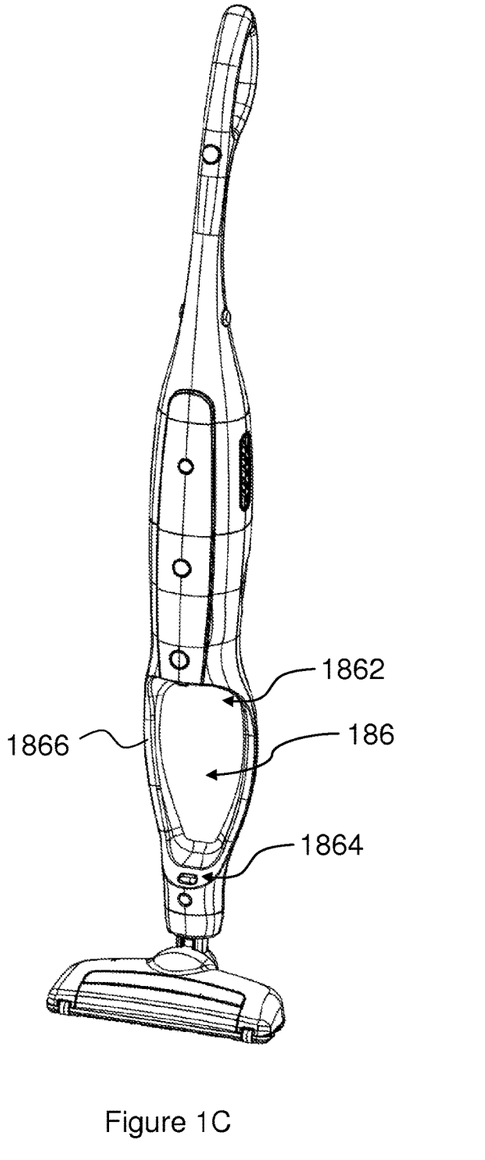
FIG. 1C is a front perspective view of FIG. 1 with its primary filter assembly detached.

The vacuum cleaner will be in an upright configuration as depicted in FIGS. 1 and 1A upon assemble and when in storage. To use the vacuum cleaner for normal vacuuming operation, an operator will release the vacuum cleaner 100 from its stowed upright configuration and adjust the inclination of the main body 160 until the handle portion 140 is at a convenient height for ergonomic use by the operator. As the main body 160 and the suction head of the vacuum cleaner are connected by a universal joint, the main body 160 can be tiled towards and away from the suction head 120 or sideways of suction head 120.

To operate the vacuum cleaner, an operator will move the vacuum cleaner to the area to be cleaned and position the suction head directly above the portion of a surface to be vacuum cleaned. The operator will actuate the suction generator of the vacuum cleaner by operating the on/off switch on the handle portion. Vacuuming suction generated by the suction generator will appear at the suction head and draws dusted air from the surface below into the suction head. The dusted air will travel up the lower body portion 180 through the internal air duct 1926 at the bridging portion and enter the primary dust filter assembly 190 via the inlet coupler 1922.

After entering the primary dust filter assembly 190, the dusted air will be guided by the inlet duct 1910 to enter into the cleansing liquid bath in the primary reservoir. The dusted air will emerge from the liquid bath as filtered air after having encountered the cleansing liquid of the cleansing liquid bath and agitated or rinsed thereby. The rinsed air will exit from the primary dust filter assembly 190 via the air outlet 1908 and enter the secondary dust collection chamber of the upper body portion 170. The rinsed air on encountering the secondary filter 178 inside the upper body portion 170 will be dry filtered and finally exit the vacuum cleaner 100 via the grille 176.

When the vacuum cleaner 100 is tilted during operation, cleansing liquid will flow out of the primary reservoir and moves towards the air outlet 1908. The cleansing liquid is intercepted by the secondary reservoir and adverse consequences due to movement of cleansing liquid into the suction generator are mitigated.

When the cleansing liquid bath becomes dirty, a user will detach the primary dust filter assembly 190 from the filter receptacle to clean the liquid container and replace cleansing liquid. When light vacuuming work is required or when vacuuming is to be done without aqueous cleansing liquid filtering, the upper body portion 170 can be detached form the lower body portion 180 for use as a portable vacuum cleaner.

Figure 6:
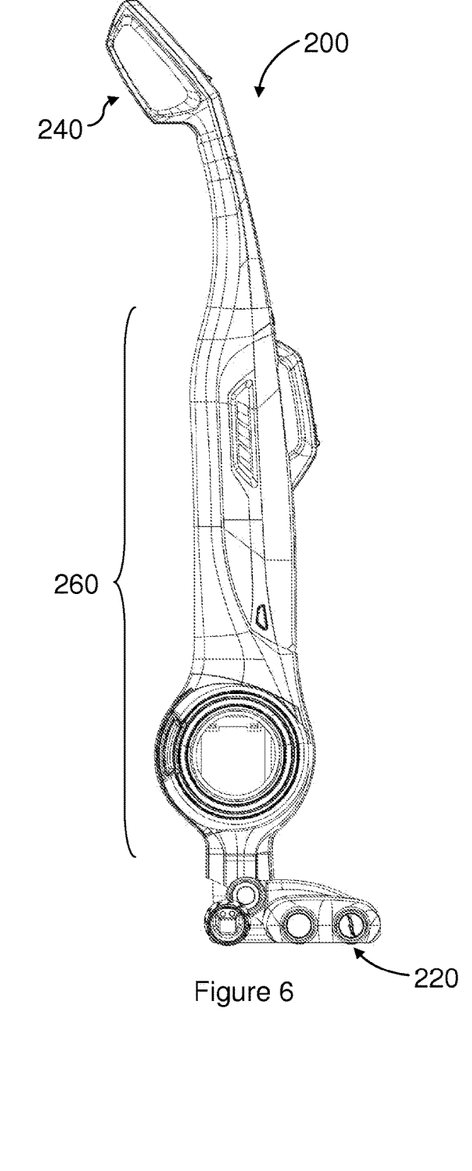
FIGS. 6 and 6A are respectively a side view and a perspective view depicting another vacuum cleaner of the present disclosure.
Figure 6A:
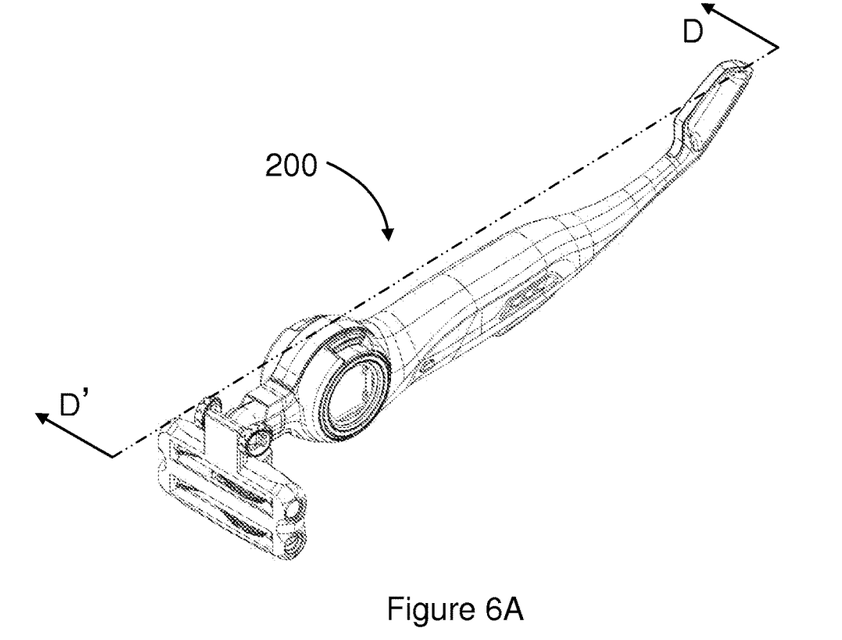
Figure 6B:
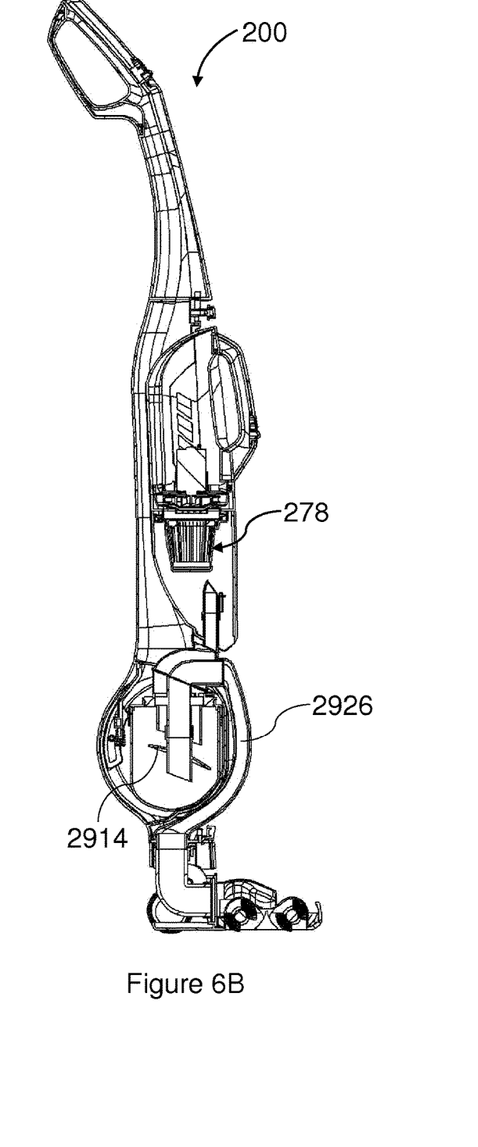
FIG. 6B is a longitudinal cross sectional view of the vacuum cleaner of FIG. 6 taken along line D-D' of FIG. 6A, FIGS. 7 and 7A are respectively a perspective view of a primary dust filter assembly detached from the vacuum cleaner of FIG. 6 and a perspective view of the vacuum cleaner of FIG. 6 with the primary dust filter assembly detached.
Figures 7, 7A:
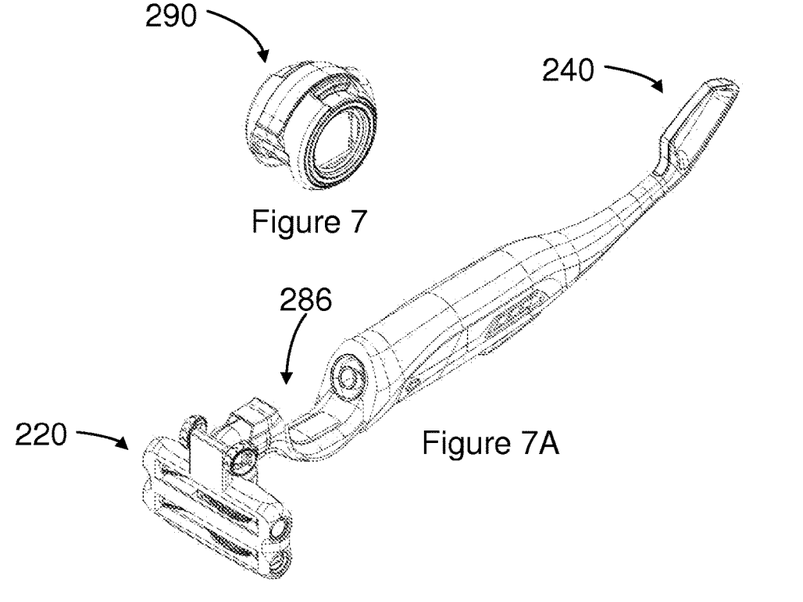

A vacuum cleaner 200 depicted in FIGS. 6, 6A and 6B comprises a suction head 220, a handle portion 240, a main body 260, and a primary dust filter assembly 290 which is mounted on the main body 260. The main body 260 comprises a rigid and elongate main housing portion which defines an axially extending hollow compartment and a main longitudinal axis extending through the interior of the hollow compartment. A filter receptacle 296 for receiving the dust filter 290 is formed on the main body 260 at an elevated location that is proximal to the suction head 220. The rigid elongate main housing portion of the main body 260 connects the handle portion 240 to the suction head 220, and the main body 260 is connected to the suction head 220 by a hinge joint. The hinge axis of the hinge joint which connects the main body and the suction head is orthogonal or substantially orthogonal to the main longitudinal axis. The suction head 220 includes a surface contact portion on which a transversely extending suction slit is defined.

As the vacuum cleaner 200 is functional identical to that of the vacuum cleaner 100, the same parts components and description 100 are incorporated herein by way reference with appropriate modifications except otherwise described herein. For example, numerals of parts used in description of the vacuum cleaner 100 will be added by 100 where the numeral is 3-digit and by 1000 where the numeral is 4-digit.

Figure 8:
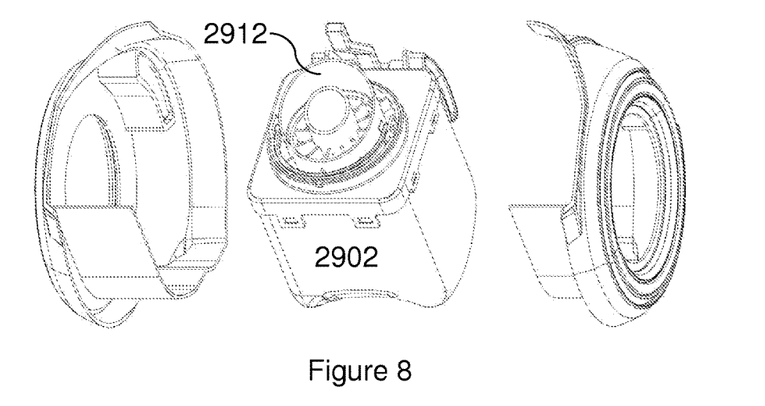
FIG. 8 is a partially exploded view of the primary dust filter assembly of FIG. 7.
Figure 8A:
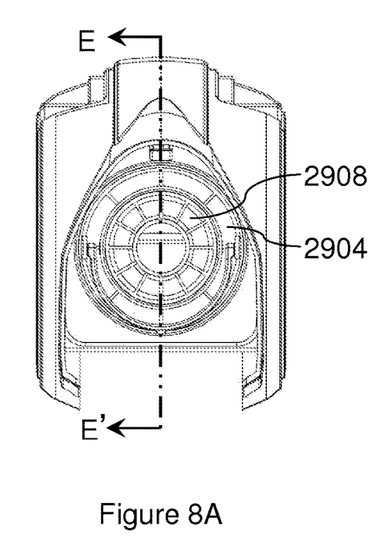
FIG. 8A is a side view of the primary dust filter assembly of FIG. 7.
Figure 8B:
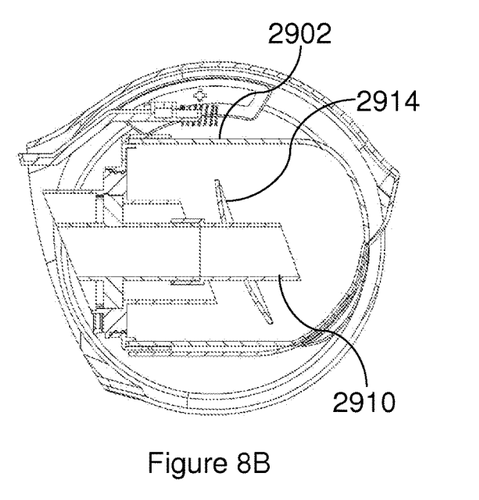
FIG. 8B is a cross-sectional view of the primary dust filter assembly of FIG. 7 along line E-E'.

As the main body 260 of the vacuum cleaner is so hinged to the suction head, the main body 260 is restricted to move towards or away from the suction head by hinged movement about the suction head and sideway or lateral tiling movement is not allowed. As tilting apart from the aforesaid is not allowed in this vacuum cleaner, secondary reservoirs are only provided on opposite sides of the air inlet duct 2910 in the direction of allowable tilting movement. As depicted in FIGS. 8, 8A and 8B, the peripheral wall of the liquid container of the primary dust filter assembly 290 has a concavely curved profile on opposite sides of the air inlet duct 2910 to define a pair of opposite disposed secondary reservoirs. On the other hand, the peripheral wall of the liquid container of the primary dust filter assembly 290 has a flat profile on the opposite sides of the air inlet duct 2910 corresponding to the lateral sides.

In addition, the anti-splash baffle 2914 is inclined with respect to the air inlet duct 2910 to cater for an anticipated inclination of the main body 260 during normal vacuuming operation.

While the present disclosure has been illustrated with reference to the various examples herein, it should be appreciated by persons skilled in the art that the examples are to assist understanding only and are not to be used to restrict scope of the disclosure. For example, while an example vacuum cleaner described herein is equipped with a secondary filter, a vacuum cleaner according to the present disclosure does not require a secondary filter and can operate with a primary dust filter assembly only. While an example vacuum cleaner described herein is equipped with a detachable portable vacuum cleaner, it should be appreciated that the suction assembly may be an integral non-detachable part of the vacuum cleaner. While an example vacuum cleaner described herein is assembled from modular components, components may be permanently attached without loss of generality. Furthermore, while a stick or broom type vacuum cleaner is illustrated as an example herein, it should be appreciated that the wet dust filter described herein may be incorporated in other types of vacuum cleaners such as the upright type without loss of generality.

| Table of numerals | | |
|---|---|---|
| 100 Vacuum cleaner | 120 Suction head | |
| 140 Handle portion | 142 Looped handle | 144 Coupler end |
| 160 Main body | 146 On/OFF button | |
| 170 upper body portion | 172 Upper tapered end | 174 Lower suction inlet end |
| | 176 grille | 178 Secondary filter |
| 180 Lower body portion | 182 Upper skirt end | 184 Lower joint end |
| 186 Filter receptacle | 1862 Upper axial end | 1864 Lower axial end |
| | 1866 bridging portion | 1868 Air duct |
| 190 Dust filter | 1902 Liquid container | 1904 Top member |
| | 1906 Dusted air inlet | 1908 Air outlet |
| | 1910 Inlet duct | 1912 Outlet duct |
| | 1914 Anti-splashing baffle | |
| 192 Filter coupling device | 1922 Inlet coupler | 1924 Outlet coupler |
| | | 1924' Outlet aperture' |
| | | 1926 Internal air duct |

The invention claimed is:

1. A dust filter comprising an air inlet, a liquid container comprising a bottom surface and a peripheral wall and defining a first reservoir for holding a cleansing liquid bath to facilitate liquid cleansing of dusted air and a second reservoir for receiving and storing cleansing liquid that moves away from said first reservoir in response to tilting of said dust filter, an inlet duct extending from the air inlet to inside the liquid bath, and an air outlet at a top end of the liquid container for liquid cleansed air to egress from said liquid bath; wherein the bottom surface of the liquid container cooperates with a first axial portion of the peripheral wall to define the first reservoir and the second reservoir is defined on a second axial portion of the peripheral wall which is above the first axial portion of the peripheral wall;
wherein the peripheral wall flares or spreads outwardly on projecting upwardly away from the first reservoir and then converges to narrow as it extends towards the top end of the liquid container to define the second reservoir; and
wherein said air inlet, said air outlet and said air inlet duct collectively form a detachable assembly which is removable from a top end of said dust filter.

2. A dust filter according to claim 1, wherein the second reservoir is located between the air outlet and the first reservoir, and the volume of said second reservoir is comparable to or larger than that of said first reservoir such that cleansing liquid moving away from said first reservoir and towards said air outlet due to titling of said dust filter will be received by said second reservoir.

3. A dust filter according to claim 2, wherein said second reservoir comprises a concave receptacle which surrounds said inlet duct or two concave receptacle portions which are on diametric opposite sides of said inlet duct.

4. A dust filter according to claim 1, wherein the dust filter comprises a rigid housing on which said first reservoir and said second reservoir are defined, and the portion of said rigid housing that defines said second reservoir flares or gradually spreads outwards on extending concavely away from the first reservoir initially and then tapers or converges to narrow on extending concavely towards the top end of the liquid container to define a or said concave receptacle or a or said concave receptacle portion as it extends away from said first reservoir and in a direction towards said air outlet.

5. A dust filter according to claim 1, wherein said peripheral wall interconnecting said air outlet and said first reservoir defines said second reservoir, and said peripheral wall defines a curved volume which tapers towards said first reservoir to define said second reservoir.

6. A dust filter according to claim 1, wherein said first reservoir is at bottom, said air outlet is at top, and said second reservoir is intermediate said first reservoir and said air outlet; and wherein said second reservoir is formed as a continuation to said first reservoir to define a liquid receptacle which is at an inclination to that of said first reservoir.

7. A dust filter according to claim 6, wherein said inclination is larger than or equal to one of 15°, 30°, 45°, 60°, 75°, 90° and/or smaller than or equal to one of −15°, −30°, −45°, −60°, −75°, −90° relative to liquid surface of said first reservoir when said dust filter is not tilted.

8. A dust filter according to claim 1, wherein said air inlet is surrounded by said air outlet, and said air inlet duct is suspended on said rigid housing and extends in an axial direction downwards towards and into said first reservoir, said axial direction being orthogonal or substantially orthogonal to liquid surface of said first reservoir when said dust filter is not tilted.

9. A dust filter according to claim 1, wherein a baffle is formed on said air inlet duct at a level above the cleansing liquid level defined by said first reservoir to block upward splashing of cleansing liquid from said first reservoir towards said air outlet during normal vacuuming operation.

10. A dust filter according to claim 9, wherein an air outlet duct is provided to guide air egressed from said first reservoir to move to said air outlet, wherein said air outlet duct surrounds said air inlet duct, extends towards said first reservoir, stops at an elevation above said baffle and has an aperture shielded by said baffle.

11. A vacuum cleaner comprising a suction head, a suction generator operable to generate vacuuming suction at the suction head to take in dusted air, a handle portion adapted to move the suction head to work on a surface to be vacuumed, and a dust filter; wherein the dust filter is to operate at an elevation level above said surface and/or said suction head during normal vacuuming operation and said elevation changes in response to change in tilting of said handle portion relative to said surface and/or said suction head; and wherein said dust filter comprises a reservoir to define a cleansing liquid bath to facilitate cleansing of dusted air coming in from said suction head; wherein the dust filter comprises an air inlet, a liquid container comprising a bottom surface and a peripheral wall and defining a first reservoir for holding the cleansing liquid bath to facilitate liquid cleansing of dusted air and a second reservoir for receiving and storing cleansing liquid that moves away from said first reservoir in response to tilting of said dust filter, an inlet duct extending from the air inlet to inside the liquid bath, and an air outlet at a top end of the liquid container for liquid cleansed air to egress from said liquid bath; wherein the bottom surface of the liquid container cooperates with a first axial portion of the peripheral wall to define the first reservoir and the second reservoir is defined on a second axial portion of the peripheral wall which is above the first axial portion of the peripheral wall;

wherein the peripheral wall flares or spreads outwardly on projecting upwardly away from the first reservoir and then converges to narrow as it extends towards the top end of the liquid container to define the second reservoir;

wherein said dust filter is mounted on a filter receptacle formed on a rigid and elongate housing portion that connects the handle portion to the suction head such that said dust filter follows movements of said handle portion during normal vacuuming operation, wherein an assembly comprising said handle portion and said dust filter is moveable, for example pivotally moveable, relative to said suction head about a hinge axis or a universal joint, and wherein said hinge axis being orthogonal or substantially orthogonal to a longitudinal axis extending along said elongate housing portion.

12. A vacuum cleaner according to claim 11, wherein said filter receptacle is adapted to detachably receive said dust filter, and said dust filter is to move towards said receptacle for attachment and move away from said receptacle for detachment in a direction orthogonal or substantially orthogonal to said longitudinal axis.

13. A vacuum cleaner according to claim 12, wherein said filter receptacle comprises a concavely curved back portion which is shaped for fitted reception of said dust filter; wherein said dust filter is formed as a plug-in module for plug-in coupling into the filter receptacle to operate with said suction head and said suction generator; and wherein latching mechanisms are formed on corresponding upper and lower axial ends of said dust filter and said filter receptacle to facilitate releasable latching between said dust filter and said filter receptacle to facilitate said plug-in coupling.

14. A vacuum cleaner according to claim 13, wherein a dusted inlet channel connects between said suction head and said dust filter, and said dusted air inlet channel extends from said suction head to beyond said dust filter and returns towards said dust filter for air coupling therewith.

15. A vacuum cleaner according to claim 11, wherein the peripheral wall has a concavely curved profile to define a secondary reservoir having a concave base.

16. A vacuum cleaner according to claim 11, further comprising a secondary dust filter which is downstream of said dust filter, wherein said secondary dust filter is a dry filter, such as a pleated element type filter or a multi-stage filter.

17. A vacuum cleaner according to claim 16, wherein said vacuum cleaner is a stick-like or broom-like shaped vacuum cleaner.

18. A vacuum cleaner according to claim 17, wherein said suction generator is mounted on said rigid and elongate housing portion and above said filter receptacle.

* * * * *